(12) United States Patent
Maceyka et al.

(10) Patent No.: US 7,160,086 B2
(45) Date of Patent: Jan. 9, 2007

(54) ROTARY MACHINE COOLING SYSTEM

(75) Inventors: Thomas D. Maceyka, Arvada, CO (US); James A. Stromley, Broomfield, CO (US)

(73) Assignee: Sundyne Corporation, Arvada, CO (US)

( * ) Notice: Subject to any disclaimer, the term of this patent is extended or adjusted under 35 U.S.C. 154(b) by 338 days.

(21) Appl. No.: 10/353,291

(22) Filed: Jan. 29, 2003

(65) Prior Publication Data

US 2004/0146411 A1 Jul. 29, 2004

(51) Int. Cl.
*F04B 17/03* (2006.01)
*H02K 9/06* (2006.01)

(52) U.S. Cl. .......................... 417/368; 310/63

(58) Field of Classification Search ............... 417/366, 417/350, 372, 205, 257, 423.3, 423.5, 365, 417/52.54, 58.62, 63.64, 60, 367, 368; 310/52.54, 310/58.62, 63.64, 60 A, 60 R, 63; 165/156
See application file for complete search history.

(56) References Cited

U.S. PATENT DOCUMENTS

| | | | |
|---|---|---|---|
| 2,915,656 A | | 12/1959 | Schwan |
| 2,970,233 A | * | 1/1961 | Penney .................. 310/63 |
| 3,143,675 A | | 8/1964 | Hauenstein |
| 3,170,407 A | | 2/1965 | Johnson |
| 3,341,113 A | | 9/1967 | Sebok et al. |
| 3,441,758 A | | 4/1969 | Albright et al. |
| 3,475,631 A | * | 10/1969 | Bollibon et al. ............ 310/58 |
| 3,643,119 A | * | 2/1972 | Lukens ..................... 310/60 R |
| 3,704,078 A | | 11/1972 | Conery et al. |
| 3,797,270 A | | 3/1974 | Laing et al. |
| 4,186,317 A | * | 1/1980 | Sisk ........................ 310/60 R |
| 4,931,678 A | | 6/1990 | Lutz |
| 5,181,837 A | * | 1/1993 | Niemiec .................... 417/350 |
| 5,250,863 A | * | 10/1993 | Brandt ....................... 310/54 |
| 5,308,229 A | * | 5/1994 | DuPuis et al. ............ 417/368 |
| 5,473,211 A | | 12/1995 | Arkkio |
| 5,478,222 A | | 12/1995 | Heidelberg et al. |
| 5,744,880 A | * | 4/1998 | Kudoh et al. ............ 310/58 |

(Continued)

FOREIGN PATENT DOCUMENTS

DE    19635196 A1    3/1998

(Continued)

OTHER PUBLICATIONS

M.G. Say, "Alternating Current Machines", A Halsted Press Book, pp. 118-120.

(Continued)

*Primary Examiner*—Charles G. Freay
(74) *Attorney, Agent, or Firm*—Carlson, Gaskey & Olds

(57) ABSTRACT

A rotary machine cooling system is provided that includes a housing having an inlet and outlet. A rotor supported in the housing for rotation about an axis with the rotor including an outer surface. A stator is disposed within the housing about the rotor having an inner surface adjacent to the outer surface of the rotor. A gap is formed between the inner and outer surfaces sufficient to reduce friction and permit convection cooling. The gap is in fluid communication with the inlet and outlet, and a pumping device pumps a cooling gas from the inlet into the gap and through said outlet. The pumping device includes an impeller affixed to an end portion of the rotor to create an axial airflow into the gap. Preferably, the present invention air cooling system is used in conjunction with a liquid cooling system arranged exteriorly to the stator. The liquid cooling system reduces the amount of air needed to flow between the gap to remove the desired amount of heat from the machine.

19 Claims, 2 Drawing Sheets

U.S. PATENT DOCUMENTS

| | | | |
|---|---|---|---|
| 5,890,880 A * | 4/1999 | Lustwerk | 417/366 |
| 5,927,941 A * | 7/1999 | Kato et al. | 415/112 |
| 6,355,995 B1 | 3/2002 | Jeppesen | |
| 6,700,235 B1 * | 3/2004 | McAfee | 310/52 |
| 6,746,215 B1 * | 6/2004 | Tani et al. | 417/366 |
| 6,891,291 B1 * | 5/2005 | Weihsmann | 310/62 |

FOREIGN PATENT DOCUMENTS

| | | |
|---|---|---|
| DE | 10122425 A1 | 11/2002 |
| WO | WO 02/49193 | 12/2001 |
| WO | WO 02/086324 | 10/2002 |

OTHER PUBLICATIONS

Enrico Levi, "Polyphase Motors A Direct Approach To Their Design", A Wiley-Interscience Publication, pp. 217-218.
"HST Ventilator Cooling Flow Arrangements", (High Sppel Tech 04).
Search Report PCT/US2004/001380.

* cited by examiner

ROTARY MACHINE COOLING SYSTEM

BACKGROUND OF THE INVENTION

This invention relates to a cooling system for an electromechanical rotary machine.

Electromechanical rotary machines, such as electric motors or generators, may generate a significant amount of heat during their operation. This is particularly true for electromechanical rotary machines in aircraft applications, which rotate at high speeds of up to 200,000 RPM or more. This heat generation comes from two major sources, electrical losses and friction losses. At very high rotation speeds, friction losses become dominant. These losses cause reduced machine efficiency, and when dissipated in heat, they result in high temperatures. Speeds can be limited by the temperature capabilities of the materials of construction. Successful high-speed motor or generator designs need to minimize the friction losses, not only to improve machine efficiency, but also to provide for carrying the heat of the friction losses away from the surfaces most affected and thus keep maximum temperatures within the limits of the materials of construction.

Liquid cooling devices have been developed that are arranged around the exterior of the machine housing to remove heat. This liquid cooling device and method may be insufficient at times. However, there is no satisfactory solution in the prior art that may be incorporated. Accordingly, it is necessary to develop a cooling system that removes a greater amount of heat than prior art systems.

Typically a very narrow gap is used between rotors and stators. More recently, an electromechanical rotary machine configuration has been developed that utilizes a wider gap between the rotor and stator in an effort to minimize frictional loses caused by the narrow gap in the prior art. Prior art machines have incorporated internal cooling airflow routed through the machine in a variety of ways, but the narrow gap between the rotor and stator does not permit a cooling airflow sufficient for cooling at high rotational speeds there between.

Another prior art machine applies pressurized air during a start-up procedure to displace any oil in the gap or prevent entry of additional oil into the gap. The prior art indicates that air should not be used in the gap for cooling because pressurized air supplied to the gap at high rotational speeds would produce undesirable friction and heating of the rotor and stator.

Therefore, what is needed is an improved electromechanical rotary machine system that provides improved cooling by the use of airflow to directly remove heat from the rotor and stator surfaces.

SUMMARY OF THE INVENTION AND ADVANTAGES

The present invention provides a rotary machine cooling system that includes a housing having an inlet and outlet. A rotor is supported in the housing for rotation about an axis with the rotor including an outer surface. A stator is disposed within the housing about the rotor having an inner surface adjacent to the outer surface of the rotor. A gap is formed between the inner and outer surfaces sufficient to permit convection cooling. The gap is in fluid communication with the inlet and outlet, and a pumping device pumps a cooling gas from the inlet into the gap and through said outlet. The pumping device includes an impeller affixed to an end portion of the rotor to create an axial airflow into the gap.

Preferably, the present invention air cooling system is used in conjunction with a liquid cooling system arranged exteriorly to the stator. The liquid cooling system reduces the amount of air needed to flow between the gap to remove the desired amount of heat from the machine. This, in turn, reduces the power draw on the shaft for an integral cooling fan, minimizes the size of the cooling ducts, and reduces the associated noise levels.

Accordingly, the above invention provides an improved electromechanical rotary machine that provides improved cooling by the use of airflow to directly remove heat from the rotor and stator surfaces.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
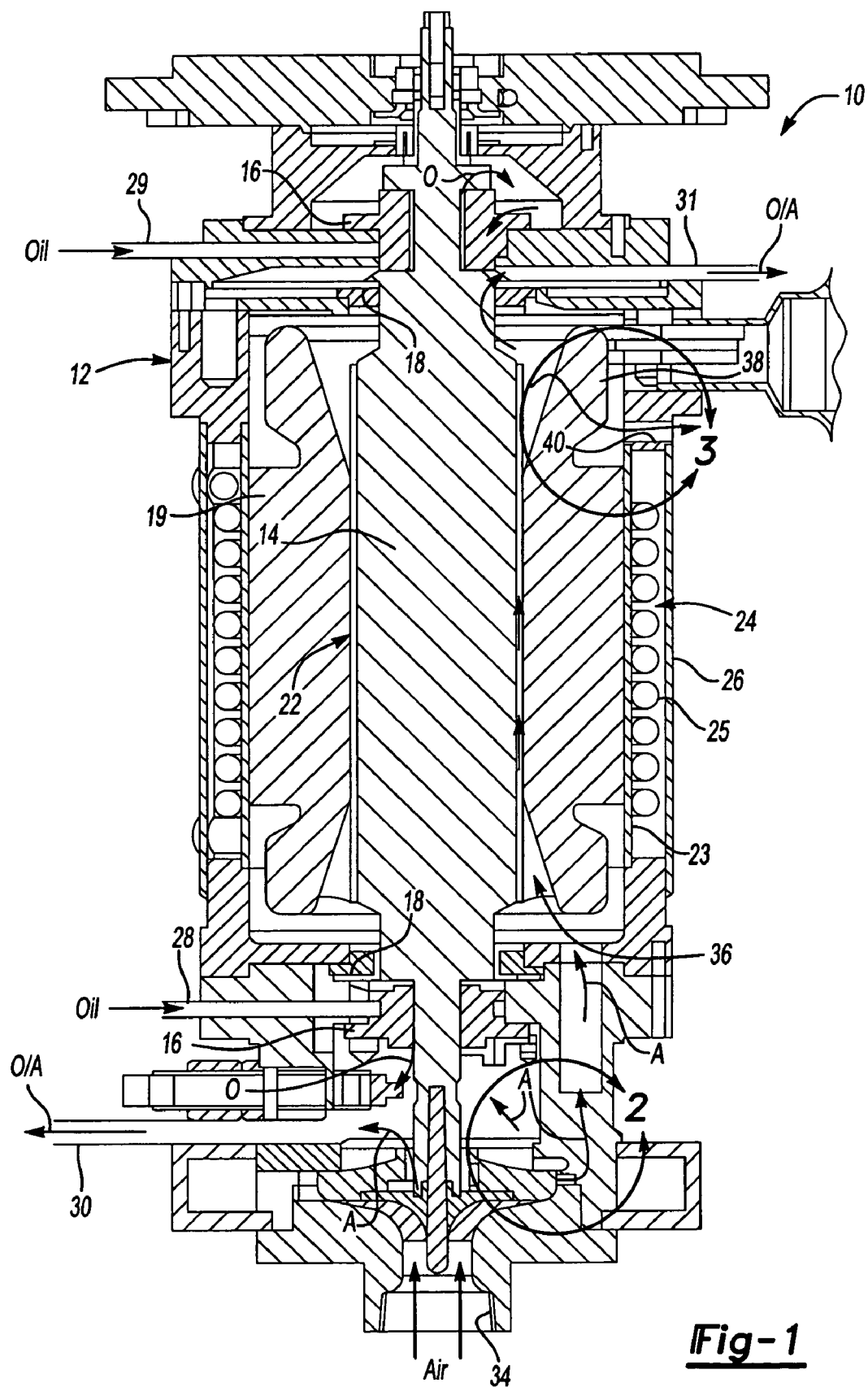
FIG. 1 is a cross-sectional view of the present invention electromechanical rotary machine cooling system.

An electromechanical rotary machine 10 is shown in FIG. 1. The machine 10 includes a housing 12 with a rotor 14 supported within the housing 12 by bearings 16 arranged at either end of the rotor 14. The housing 12 may include one or more components secured to one another. Oil seals 18 are arranged between the housing 12 and rotor 14 and are located further inward of the bearings 16. It should be understood that additional bearings and seals may be used in the machine 10. A stator 19 is disposed within the housing 12 and is arranged about the rotor 14. The machine 10 may be a generator in which case the rotor 14 is driven about its axis to generate an electrical current in the stator 18. Alternatively, the machine 10 may be a motor in which current flows through the stator 19 generating a magnetic field in the rotor 14 to effect rotation of the rotor 14 about its axis.

The rotor 14 includes an outer surface 20, and the stator 19 includes an inner surface 21 adjacent to the outer surface 20. A gap 22 is formed between the outer 20 and inner 21 surfaces. The gap 22 is designed to minimize frictional loses during operation of the machine 10 while permitting air to flow through the gap 22 sufficient to cool the surfaces 20 and 21 by convection, which will be appreciated from the discussion below.

The housing 12 may include a structural wall 23 and a shell 26 spaced outwardly from the wall 23. The machine 10 preferably includes a liquid cooling device 24 arranged exteriorly of the stator 19 to remove heat from the machine 10. The liquid cooling device 24 may be a helical coil 25 secured to the wall 23, as shown in FIG. 1. Such a cooling device is disclosed in patent application Ser. No. 09/862,910 filed on May 22, 2001, filed in the name of the present Assignee. As discussed above, a liquid cooling device alone may not be sufficient to remove the desired amount of heat from the machine 10. Accordingly, the cooling system may be supplemented with an additional cooling device.

The bearings 16 are lubricated with oil O that enters the machine at oil inlets 28 and 29. The oil is retained at the rotor ends by seals 18 to lubricate the bearings 16 and prevent oil O from entering the interior of the machine particularly in the area of the gap 22, which may inhibit desired operation of the machine 10. Once the oil has lubricated the bearings 16, the oil O exits through oil outlets 30 and 31 where it is recirculated through a known type of oil lubrication system.

Figure 2:
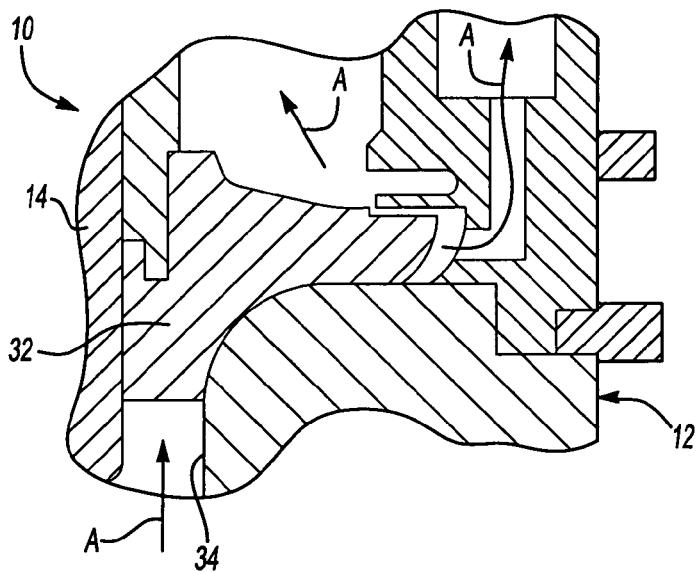
FIG. 2 is an enlarged cross-sectional view taken of the area indicated by circle 2 in FIG. 1.
Figure 3:
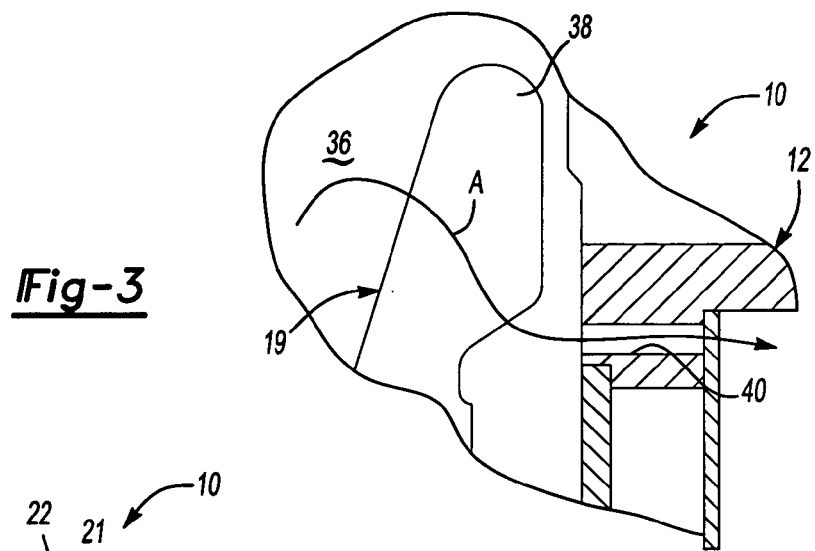
FIG. 3 is an enlarged cross-sectional view taken of the area indicated by circle 3 in FIG. 1.

A gas such as air is used to cool the machine 10 in the area of the rotor 16 and stator 19. In particular, a pumping device, such as an impeller 32 attached to the rotor 14, pumps air A continuously from an air inlet 34 in an generally axial direction, best shown in FIG. 2, into the gap 22. The pressurized air exits an air outlet 40, as best shown in FIG. 3. The axial flow of air from the impeller and into the gap provides flow through the machine 10 while reducing turbulence that may occur with other routings of airflow through the machine.

The air flowing through the gap 22 creates a pressurized chamber 36 in the interior of the machine 10 which aides in retaining oil in the bearing areas. It is undesirable for any oil to enter the chamber 36. Air may leak past the seals 18 and exit through the oil outlets 30 and 31 with the oil. In this case, the machine 10 may be designed to utilize the air to separate oil from the air in a known manner, or baffles and passages may be used to separate the oil from the air, as is known.

Figure 4:
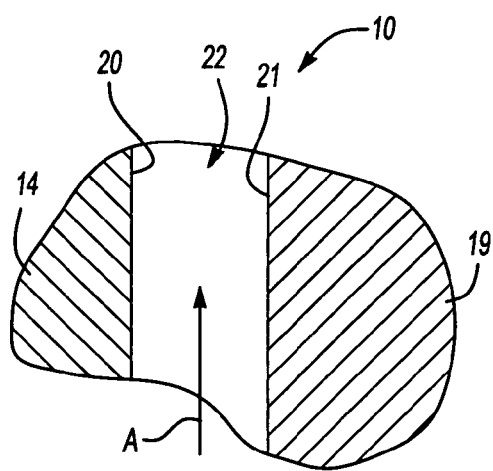
FIG. 4 is an enlarged cross-sectional view of the air cooling gap.

The air outlets 40 may be arranged near the end windings 38 of the stator 19. Air A flows through the end windings 38 to further cool the stator. The air flows generally radially from the upper winding 38 to the outlet 40. As best shown in FIG. 4, the air flows in direct contact with the outer 20 and inner 21 surfaces. Heat is removed directly from the surfaces 20 and 21 of rotor 14 and stator 19 by convection. Intermediate walls used in some prior art machines do not remove heat effectively from the rotor and stator surfaces because the walls act as an insulator retaining heat within the enclosed machine components.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A rotary machine cooling system comprising:
a housing having an inlet and an outlet;
a rotor supported in said housing for rotation about an axis with said rotor having an outer surface;
a stator disposed within said housing about said rotor with said stator having an inner surface, and a gap interposed between said inner and outer surfaces, said gap in fluid communication with said inlet and said outlet;
a pumping device pumping a cooling gas through said inlet into said gap and through said outlet; and
wherein said rotor includes opposing ends with seals arranged between said opposing ends and said housing, said housing defining a pressurized gas chamber between said seals, and said stator disposed in said chamber.

2. The system according to claim 1, wherein said pumping device is an impeller attached coaxially to said rotor.

3. The system according to claim 2, wherein said impeller is arranged proximate to said inlet.

4. The system according to claim 1, wherein bearings support said rotor in said housing with lubricating system circulating oil to said bearings, and wherein said cooling gas mixes with said oil with an oil separator located external to said pressurized chamber separating said oil from said cooling gas.

5. The system according to claim 1, wherein said stator includes opposing end windings with said inlet arranged near one of said end windings and said outlet arranged near the other of said windings with said gas flowing through said windings.

6. The system according to claim 1, wherein a liquid cooling system is arranged around said stator removing heat from said rotary machine reducing an amount of cooling gas required to cool said rotary machine.

7. The system according to claim 6, wherein said liquid cooling system is a helical coil arranged about said stator.

8. The system according to claim 1, wherein said outer surface is a rotating surface relative to said stator with said cooling gas contacting said outer surface.

9. The system according to claim 8, wherein said seals engage said outer surfaces.

10. The system according to claim 1, wherein said pumping device is axially outboard of said seal.

11. A method of cooling a rotary machine comprising the steps of:
a) circulating a liquid from a location generally exterior to a stator;
b) removing a first heat from the rotary machine with the liquid;
c) forcing a gas through a gap formed between a rotor and the stator;
d) removing a second heat from the rotary machine with the gas; and
e) forcing the gas through a seal that is in engagement with the rotor, the gas commingling with the liquid past the seal.

12. The method according to claim 11, wherein step c) includes driving an impeller coupled to the rotor to generate a continuous flow of the gas through the gap.

13. The method according to claim 12, wherein the gas flows axially from the impeller and through the gap.

14. The method according to claim 11, wherein the gas is forced through end windings of the stator.

15. A rotary machine cooling system comprising:
a housing having an inlet and an outlet;
a rotor supported in said housing for rotation about an axis with said rotor having an outer surface;
a stator disposed within said housing about said rotor with said stator having an inner surface, and a gap interposed between said inner and outer surfaces, said gap in fluid communication with said inlet and said outlet
an impeller secured to the rotor proximate to the inlet pumping a cooling gas from said inlet generally axially into said gap and through said outlet; and
bearings supporting rotation of the rotor within the housing with oil circulating to the bearings, wherein said cooling gas mixes with said oil and an oil separator separates said oil from said cooling gas.

16. The system according to claim 15, wherein said rotor includes opposing ends with seals arranged between said opposing ends and said housing, said housing defining a pressurized gas chamber between said seals with said stator disposed in said chamber.

17. The system according to claim 16, wherein a lubricating system circulates oil to said bearings and said oil separator is located external to said pressurized chamber separating said oil from said cooling gas.

18. The system according to claim 15, wherein said stator includes opposing end windings with said inlet arranged near one of said end windings and said output arranged near the other of said windings with said gas flow through said windings.

19. The system according to claim 18, wherein said gas flow generally radially from said other of said windings to said output.

* * * * *

UNITED STATES PATENT AND TRADEMARK OFFICE
CERTIFICATE OF CORRECTION

| | |
|---|---|
| PATENT NO. | : 7,160,086 B2 |
| APPLICATION NO. | : 10/353291 |
| DATED | : January 9, 2007 |
| INVENTOR(S) | : Maceyka et al. |

It is certified that error appears in the above-identified patent and that said Letters Patent is hereby corrected as shown below:

Claim 15, Column 4, line 56: insert --;-- after "outlet"

Signed and Sealed this

Tenth Day of April, 2007

JON W. DUDAS
*Director of the United States Patent and Trademark Office*